Oct. 31, 1933.                C. BATTEGAY                1,933,086
                    ELECTRIC SPEEDOMETER AND MILEMETER
                    Filed Sept. 22, 1930        3 Sheets-Sheet 1

INVENTOR.
Constant Battegay
BY Cornelius Zabriskie
ATTORNEY.

Oct. 31, 1933.          C. BATTEGAY          1,933,086
ELECTRIC SPEEDOMETER AND MILEMETER
Filed Sept. 22, 1930          3 Sheets-Sheet 2
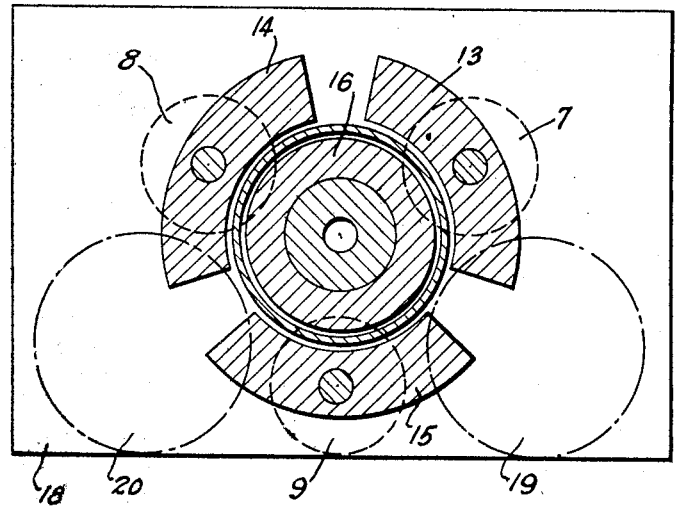
*Fig. 2*
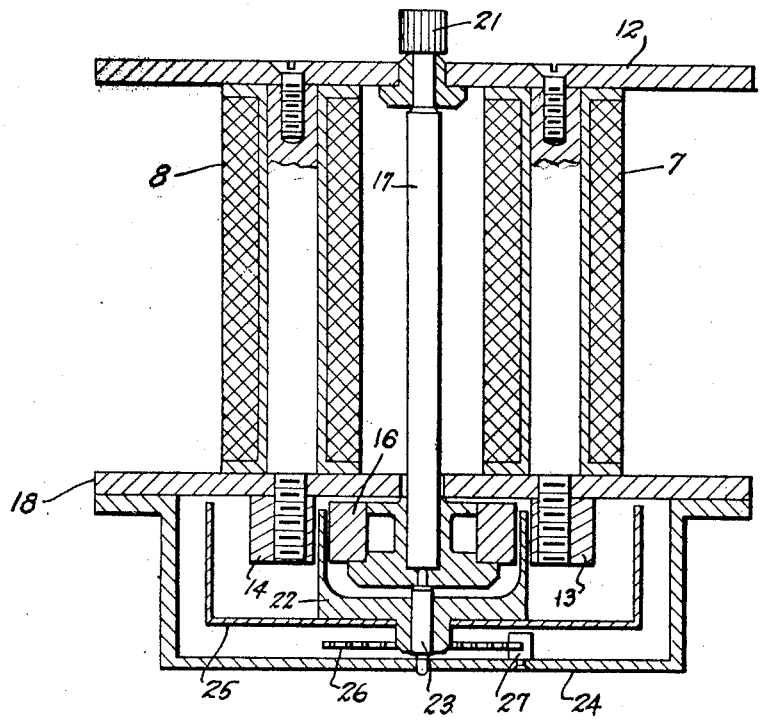
*Fig. 2ª*
INVENTOR.
Constant Battegay
BY
Cornelius Zabriskie
ATTORNEY.

Oct. 31, 1933.     C. BATTEGAY     1,933,086

ELECTRIC SPEEDOMETER AND MILEMETER

Filed Sept. 22, 1930     3 Sheets-Sheet 3

Fig. 3ª

INVENTOR.
Constant Battegay

BY
*Cornelius Zabriskie*
ATTORNEY.

Patented Oct. 31, 1933

1,933,086

UNITED STATES PATENT OFFICE 1,933,086

ELECTRIC SPEEDOMETER AND MILEMETER

Constant Battegay, Levallois-Perret, France, assignor to Societe Anonyme des Ateliers Brillie Freres, Levallois-Perret, Seine, France, a corporation of France Application September 22, 1930, Serial No. 483,675, and in France March 20, 1930

7 Claims. (Cl. 172—245)

My invention relates to speedometers for motor vehicles and aims to provide an improved electrically operated speed indicator having an associated milemeter operated directly by a part of the speedometer mechanism. The idea is to produce a simple and reliable electrically operated device of this character which requires no flexible cable drive.

Other aims and advantages of my invention will appear in the specification, when considered in connection with the several embodiments thereof shown in the accompanying drawings, wherein:

Figs. 2 and 2a are transverse and longitudinal cross-sections respectively of one form of the improved speedometer-milemeter.

Figs. 3 and 3a are similar views of a modification;

In accordance with my invention, the speedometer is operated by an electric motor driven in synchronism with a shaft, the speed of which is to be measured so as to indicate the speed of the vehicle. A rotary, multiple circuit switch is mounted on the shaft and is connected to a source of direct current, delivering current to stator coils of the electric motor so as to create a rotary magnetic field having the same speed as that of the shaft. This magnetic field actuates the speed indicating mechanism; while the rotor shaft of the motor serves through suitable gearing to drive the mileage indicator or milemeter, thereby eliminating any additional operating means.

Figure 1:
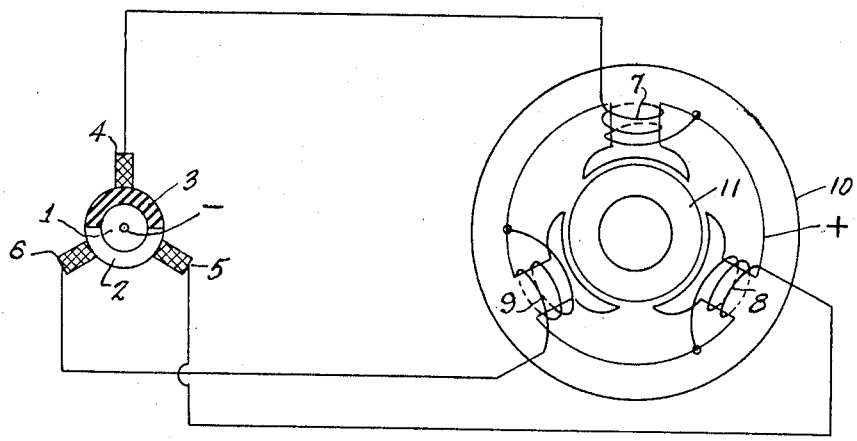
Fig. 1 is a diagrammatic view of a current controlling and converting switch and a synchronous motor controlling the speedometer-milemeter according to my invention.

Referring to Fig. 1 the rotary switch is mounted on a shaft 1 of which it is desired to measure the speed or which has a speed proportional to the speed of the vehicle. This switch comprises two half-shells 2 and 3 the former of which is a conductor and the latter an insulator. Three brushes 4, 5 and 6 spaced by 120° bear against the shell segments and are electrically connected with three coils 7, 8, 9 of a three-phase stator 10 between the poles of which a rotor 11 is adapted to revolve, said rotor comprising a ring of magnetic material, preferably cobalt steel.

The rotating conducting segment of the switch is connected with one pole of the direct current supply, the negative pole for instance, and a point common to the three windings is connected with the other pole, the positive pole.

Under these conditions, the switch sends current in succession through the three coils 7, 8 and 9 sometimes through two, sometimes through one at a time. There consequently arises a rotary field which acts on the magnetic ring or rotor and causes it to revolve by means of the eddy currents produced in the rotor as in the case of an ordinary asynchronous motor. When the rotor reaches a speed nearly synchronous with that of the rotating field, permanent magnetic poles form on the rotor which moves henceforward in synchronism as a synchronous motor. This is due to the magnetic properties of the cobalt steel.

In practice, the starting may be considered as instantaneous and the rotor synchronizes immediately with the rotary movement of the switch.

According to my invention, the rotary motion of the magnet is made use of for driving mechanically a revolution-meter or a milemeter and for driving through eddy currents an aluminium disk or dished part urged back by a spring and forming a speedometer.

The rotor performs two functions in the operation of my improved instrument. First, its shaft is connected directly to a revolution counter or milemeter. Second, it creates an additional rotating magnetic field which causes eddy currents in an aluminum disk or dished part pivoted to revolve within the rotor. This disk carries a pointer or dial on its shaft to indicate the speed. The shaft is restrained from complete rotation by a spring (Fig. 2a).

Figs. 2 and 2a show a speedometer with a revolution counter made according to my invention. In this instance, the three-phase stator has its three coils 7, 8, 9 disposed along parallel axes, the common support 12 of which is formed by an iron plate.

The coils 7, 8, 9 are provided at their outer ends with arc-shaped pole-pieces 13, 14 and 15 between which the rotary magnetic field arises.

The rotor is formed by a ring of cobalt-steel 16 keyed to a central shaft 17 pivotally secured in the two plates 12 and 18.

According to my invention, the rotor controls on one hand a milemeter indicating the mileage travelled since the start and per day. This mile meter is diagrammatically illustrated by means of the two drums 19 and 20. It is driven by a pinion 21 carried by the end of the rotor shaft and a reducing gear not shown in order not to overcrowd the drawings.

According to my invention the rotor controls on the other hand the speedometer comprising an aluminium dished part 22 secured to a shaft 23 pivotally secured on one end to the end of the rotor shaft 17 and on the other end to a bridging part 24 raised above the plate 18. The dished part 22 which in this case, projects between the pole pieces of the stator and the motor, carries a graduated drum 25 appearing partly at the front of the apparatus; it is moreover urged toward its zero position by a spiral spring 26, the inner end of which is secured to the dished part and the outer end of which is secured to a projection 27 integral with the bridging part 24.

The device is controlled by a switch similar to that shown in Fig. 1 and adapted to send current in succession through the several coils 7, 8 and 9.

The rotary field produced between the pole-pieces 13, 14 and 15 drives the rotor 16 on which a set of permanent magnet poles are formed whereby the synchronism between the rotor and the rotary field is produced. The rotor drives on the one hand the milemeter through the pinion 21 and on the other the dished part 22 of the speedometer. This dished part is disposed in the main rotary field and the eddy currents produced therein urge it along in the direction of rotation. The torque produced by the coiled spring opposes this motion and the dished part assumes a position of equilibrium depending on the speed of rotation of the rotary field. The drum 25 provided with the visible graduations allows the speed to be directly ascertained.

To make the indications of the milemeter as independent as possible of the voltage of the source of current supply, the magnetic circuit of the stator should be normally saturated.

According to a modification, the aluminium dished part may not be disposed in the rotary field produced by the current but solely in the rotary field of the magnet.

Figure 3:
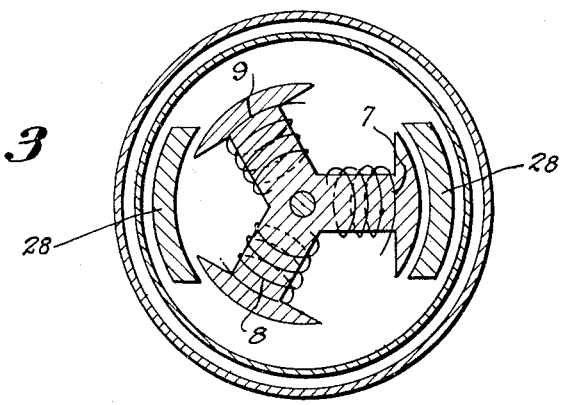

Figs. 3 and 3a show a speedometer made according to this modification wherein a U-shaped magnet is used.

The stator comprises three coils 7, 8 and 9 disposed so as to form a star, each coil core being provided with an enlarged arc-shaped head. The magnet 28 which might be ring-shaped as in Fig. 1 is shown, by way of example as being U-shaped, the arms of the U passing on either side of the stator. This magnet is adapted to rotate around a shaft 29 and is impelled by the rotary field. The dished part 30 surrounds the magnet 28, and is urged around with the rotating magnet, part of the flux of which is diverted through said part and the steel casing 31 of the device.

The dished part 30 is keyed to a shaft 32 and is urged toward its zero position by a spiral spring 33. The shaft 32 carries a hand 34 moving over a dial 35.

Figure 4:
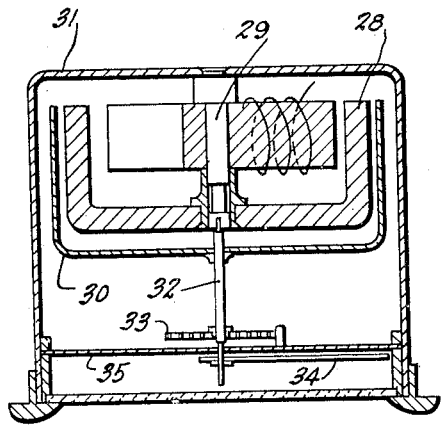
Fig. 4 is a longitudinal cross-section of a further modification.
Figure 4:
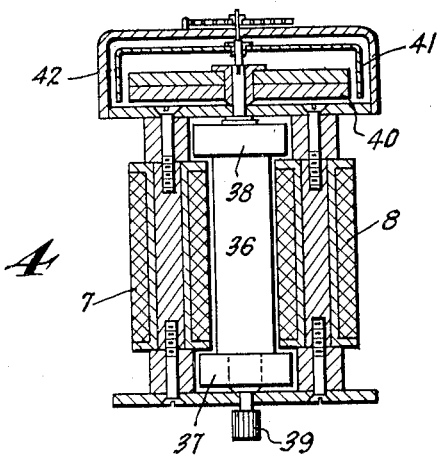

According to another modification, the dished part may be disposed instead of in the field of the magnet forming the rotor, in the field on another magnet driven by the former. Fig. 4 shows a speedometer embodying this modification. I have shown on the same figure a modification of the synchronous motor wherein the magnet 36 comprises a cylindrical rod ending with two pole-pieces 37 and 38. The coils 7, 8 and 9 the last of which is not shown in Fig. 4 are parallel to the magnet rod 36 and have terminal pole-pieces partially surrounding the pole pieces 37 and 38. The magnet rotates with the rotary field produced by the coils; it carries at one end a pinion 39 controlling the milemeter and on the other end a magnet 40 which urges the aluminium dished part 41 around by means of the flux diverted through the steel drum 42. The outside of the dished part carries a suitable scale and is partly visible through an aperture provided in the drum or casing 42.

Figure 5:
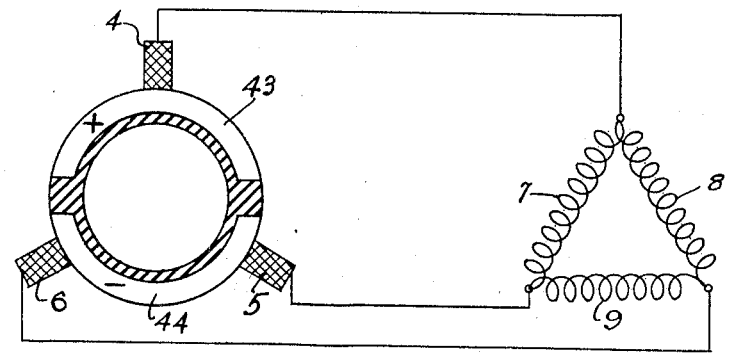
Fig. 5 is a diagrammatic view of another form of controlling switch.

Fig. 5 shows a modification of the control switch which allows a reversal in the direction of the current passing through the stator coils. The coils 7, 8 and 9 are connected as a delta, the apices of the delta being electrically connected with the three brushes 4, 5, and 6 disposed 120° apart around the rotary switch comprising two half-shells 43—44 connected, respectively, through two slip rings to the two poles of the feed battery. One of these poles may of course be grounded as well as the corresponding half shell.

When the apparatus is installed in a motor vehicle and the battery of the car is used for controlling it, it is advisable to switch off the current when the vehicle is stationary. This may be effected either by using a switch on the dashboard, if such a switch is available or by connecting the device ahead of the automatic switch normally provided on the generator. If neither of these methods is available, a centrifugal switch such as the one shown diagrammatically in Fig. 6, may be used.

Figure 6:
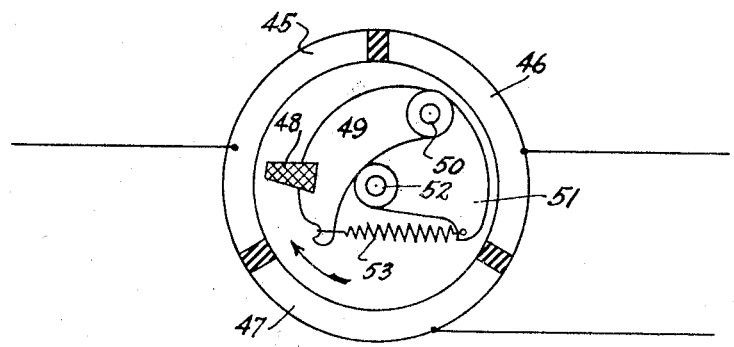
Fig. 6 is a plan view of still another form of switch.

As shown in Fig. 6, the shell portions 45, 46 and 47 are stationary and connected, respectively, with the three windings of the stator. The rotary brush 48 is secured to a lever 49 pivotally mounted at 50 on a part 51 integral with the shaft 52 the speed of which is to be controlled and connected with a pole of the battery. A spring 53 urges the lever 49 against 52 so as to switch the current off when the shaft ceases rotating. When the shaft rotates, the centrifugal forces urge the lever away from the shaft and cause the brush to rub against the switch shell whereby current from the battery is periodically sent through the different shell portions in succession.

It is obvious from the preceding description that my invention is by no means limited to the particular embodiments or to the applications described in detail. On the contrary, it covers all modifications thereof which fall fairly within the scope of appended claims.

For instance my invention may be applied solely as a revolution counter or as a milemeter or as a speedometer or as a combination of any two such apparatuses. It may be also used for controlling taxicab meters.

The embodiments of the invention may also be greatly diversified. For instance the controlling part may be a switch of any description providing reversed or non-reversed current impulses or it may be an alternator. The synchronous motor may also be of any known type, one-phase or polyphase.

What I claim is:

1. An electric meter comprising a multi phase stator, a rotor mounted coaxially of the stator and spaced therefrom, a member connected with the rotor and adapted to drive a mileage indicator, and a non-magnetic dished speed indicating part mounted coaxially of the rotor and stator and having a skirt positioned within the space between said rotor and stator.

2. An electric meter comprising a multi phase stator having a plurality of coils arranged with their axes in parallel relation and having annularly spaced apart pole pieces, a rotor mounted co-axially of said stator and spaced from the pole pieces thereof, a member connected to the rotor to drive a mileage indicator, and a non-magnetic speed indicating part projecting into the magnetic flux circuit and adapted to be rotated thereby.

3. An electric meter comprising a stator having a plurality of parallel pole pieces with coils, a rotor co-axial with and spaced from said pole pieces, a magnetic casing enclosing said stator and rotor and a non-magnetic member mounted coaxially of the rotor for independent rotation and having a skirt projecting between the rotor and the casing and spaced from both of them.

4. An electric meter comprising a stator having a plurality of parallel polar projections, a cylindrical rotor parallel to and positioned between said polar projections and terminating in pole pieces positioned between and juxtaposed with the opposite ends of the several polar projections, means connected to the rotor to drive a mileage indicator, a magnetic member operatively connected to and driven by the rotor, and a non-magnetic speed indicating part coaxial with and driven by the magnetic flux from said magnetic member.

5. An electric meter comprising a stator having a plurality of parallel polar projections, a cylindrical rotor parallel to and positioned between said polar projections and terminating in pole pieces positioned between and juxtaposed with the opposite ends of the several polar projections, means connected to the rotor to drive a mileage indicator, a magnetic member operatively connected to and driven by the rotor, a non-magnetic speed indicating part coaxial with and driven by the magnetic flux from said magnetic member, and a stationary casing of magnetic metal inclosing the magnetic member and the speed indicating part.

6. An electric meter comprising a stator to produce a rotating field of force, and in combination, in this rotating field of force, a magnet turning at the same speed as the field and a spring retarded non-magnetic conductive element driven by the turning field of the stator and of the magnet.

7. An electric meter comprising a main shaft, a stator to produce a rotating field of force rotating in a predetermined speed relation to said main shaft, and in combination, in this rotating field of force, a magnet turning at the same speed as the field, a conductive element driven by the rotating field of force of the stator and of the magnet, and an elastic element for retarding said conductive element.

CONSTANT BATTEGAY.